(12) United States Patent
Nalini et al.

(10) Patent No.: US 8,333,363 B2
(45) Date of Patent: Dec. 18, 2012

(54) REGULATING VALVE PARTICULARLY FOR REGULATING THE FLOW OF REFRIGERATION FLUIDS

(75) Inventors: Luigi Nalini, Padova (IT); Andrea Dalan, Cadoneghe (IT); Davide Scarabottolo, Abano Terme (IT)

(73) Assignee: Carel Industries S.p.A., Brugine (IT)

( * ) Notice: Subject to any disclaimer, the term of this patent is extended or adjusted under 35 U.S.C. 154(b) by 473 days.

(21) Appl. No.: 12/461,355

(22) Filed: Aug. 10, 2009

(65) Prior Publication Data

US 2010/0038570 A1 Feb. 18, 2010

(30) Foreign Application Priority Data

Aug. 18, 2008 (IT) .............................. PD2008A0251

(51) Int. Cl.
*F16K 31/02* (2006.01)
(52) U.S. Cl. .................... 251/129.11; 251/266; 251/274
(58) Field of Classification Search ............ 251/129.11–129.13, 266, 274
See application file for complete search history.

(56) References Cited

U.S. PATENT DOCUMENTS

| | | | |
|---|---|---|---|
| 4,274,444 A * | 6/1981 | Ruyak ...................... | 251/129.11 |
| 6,254,059 B1 | 7/2001 | Kurosawa et al. | |
| 7,165,755 B2 * | 1/2007 | Umezawa et al. ....... | 251/129.11 |

FOREIGN PATENT DOCUMENTS

| | | |
|---|---|---|
| CN | 101216116 A | 7/2008 |
| EP | 0 937 928 A1 | 8/1999 |
| EP | 0 999 391 A2 | 5/2000 |
| FR | 2 856 129 A1 | 12/2004 |

* cited by examiner

*Primary Examiner* — Eric Keasel
(74) *Attorney, Agent, or Firm* — Modiano & Associati; Albert Josif; Daniel O'Byrne

(57) ABSTRACT

A regulating valve has a valve body, with an inlet and an outlet for fluid, which are connected by a connecting opening, and a flow control device for the connecting opening, inserted in a seat formed in the valve body. The flow control device has a piston for controlling flow within the connecting opening which is functionally connected to an electric motor adapted to make it slide within a cylinder along a sliding axis, and a monolithic tubular jacket that surrounds, determining its coaxiality, the rotor of the electric motor and the flow control piston, further providing the cylinder.

6 Claims, 2 Drawing Sheets

REGULATING VALVE PARTICULARLY FOR REGULATING THE FLOW OF REFRIGERATION FLUIDS

BACKGROUND OF THE INVENTION

Currently, valves for regulating the flow of fluid in refrigeration systems have a structure that comprises
a valve body, provided with an inlet and an outlet for the fluid, which are connected by a connecting compartment,
a connecting compartment flow control device, inserted in an appropriately provided seat formed in the valve body.

The flow control device comprises a connecting compartment flow control piston, which is functionally connected to an electric motor.

The piston is inserted partially in a cylinder, in which it can slide by way of the action of the electric motor, to which it is functionally connected by a screw-type actuator.

The electric motor modulates the degree of obstruction of the connecting compartment by the piston, making it slide along the sliding axis, defined by the axis of the cylinder, between two extreme positions, one for complete obstruction of the connecting compartment and one for maximum opening of the connecting compartment.

The obstruction device further comprises a tubular body that accommodates a fixed core, a rotary core and a stem for the actuation of the flow control piston, which compose the screw-type actuator.

The fixed core is welded to one end of the tubular body and supports rotatably the rotary core to which the stem is connected by way of a screw-and-nut coupling.

Such stem crosses axially the fixed core and can slide along it but not rotate thanks to a guided coupling.

The rotor of the motor is also accommodated in the tubular body and is jointly fixed to the rotary core in order to impart thereto a rotation that is converted by the screw actuator into a translational motion of the stem in the fixed core along the sliding axis.

Thus, upon actuation of the motor the position of the piston in the connecting compartment is modulated, determining the degree of its obstruction.

The cylinder inside which part of the piston slides is a sleeve that is welded to the fixed core, which is also equipped for connection to the valve body, for example by means of a threaded ring for connection to a threaded seat of the valve body or by means of a flange that can be fastened against a threaded shoulder of the valve body by a thrust ring, which is commonly known as crown.

The components of the obstruction device are therefore divided into
components that are fixed to the valve body, which are the tubular body and the cylinder, which are welded to the fixed core,
components that can be turned about the sliding axis, which are the rotor and the rotary core, and
components that can perform a translational motion along the sliding axis, which are the stem and the piston.

One drawback of this structure is that in order to ensure the coaxiality of the stem with respect to the cylinder, in which the piston slides, it is necessary to have a sophisticated coupling providing coaxiality to the fixed core with the rotary core and with the sleeve that provides the cylinder.

Moreover, currently known regulating valves have balancing ducts that connect the front of the piston to a balancing chamber that it delimits within the cylinder.

Therefore, ensuring the absence of leaks from such chamber, by means of a reliable hermetic connection of the sleeve to the fixed core, is a currently felt need.

This connection is provided generally by welding, which by having to be accurate and free from defects that can compromise its tightness, is performed with high precision, to the full disadvantage of the low cost of production of this type of valve.

SUMMARY OF THE INVENTION

The aim of the present invention is to provide a valve that allows to achieve easily precise coaxiality among the components that can perform translational motion and the rotary components.

Within this aim, an object of the invention is to provide a valve that allows to achieve a reliable hermetic seal of the balancing chamber.

Another object of the invention is to provide a valve that allows to reduce sliding frictions of the piston within the cylinder.

Another object of the invention is to provide a valve that is simple and easy to use and can be manufactured with low costs.

This aim and these and other objects that will become better apparent hereinafter are achieved by a regulating valve, particularly for regulating the flow of refrigeration fluids, comprising
a valve body, which has an inlet and an outlet for fluid, which are connected by a connecting compartment,
a flow control device for said connecting compartment, inserted in an appropriately provided seat formed in said valve body,
said flow control device comprising a piston for controlling flow within said connecting compartment which is functionally connected to an electric motor for its axial movement within a cylinder, the axis of which forms a sliding axis thereof for modulatable obstruction of said connecting compartment, said valve being characterized in that said flow control device comprises a monolithic tubular jacket that surrounds, determining its coaxiality, the rotor of said electric motor and said piston, further providing said cylinder.

BRIEF DESCRIPTION OF THE DRAWINGS

Further characteristics and advantages of the invention will become better apparent from the following detailed description of a preferred but not exclusive embodiment of the valve according to the invention, illustrated by way of non-limiting example in the accompanying drawings, wherein.

DESCRIPTION OF THE PREFERRED EMBODIMENTS

Figure 1:
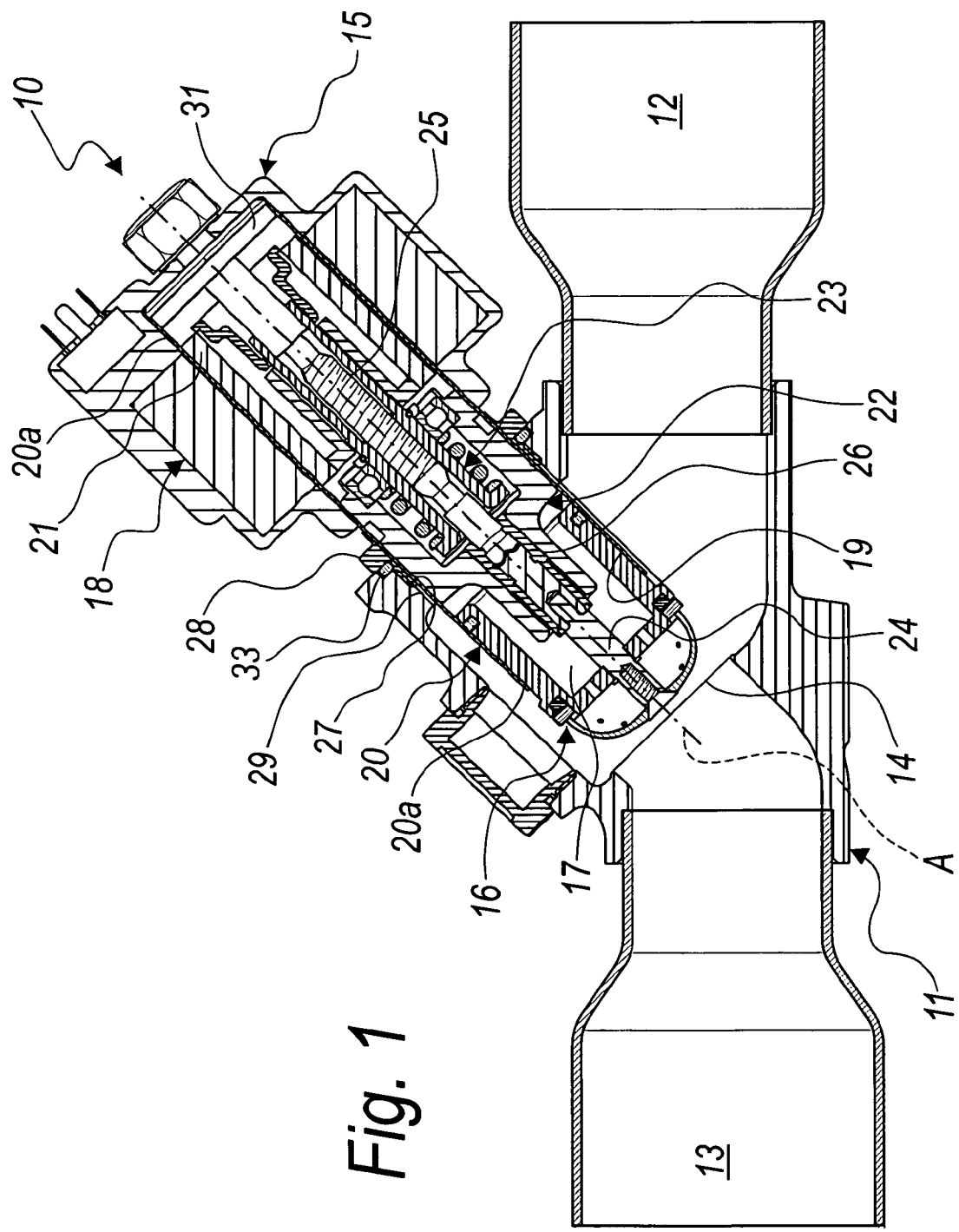
FIG. 1 is a partially sectional side elevation view of a regulating valve according to the invention.
Figure 2:
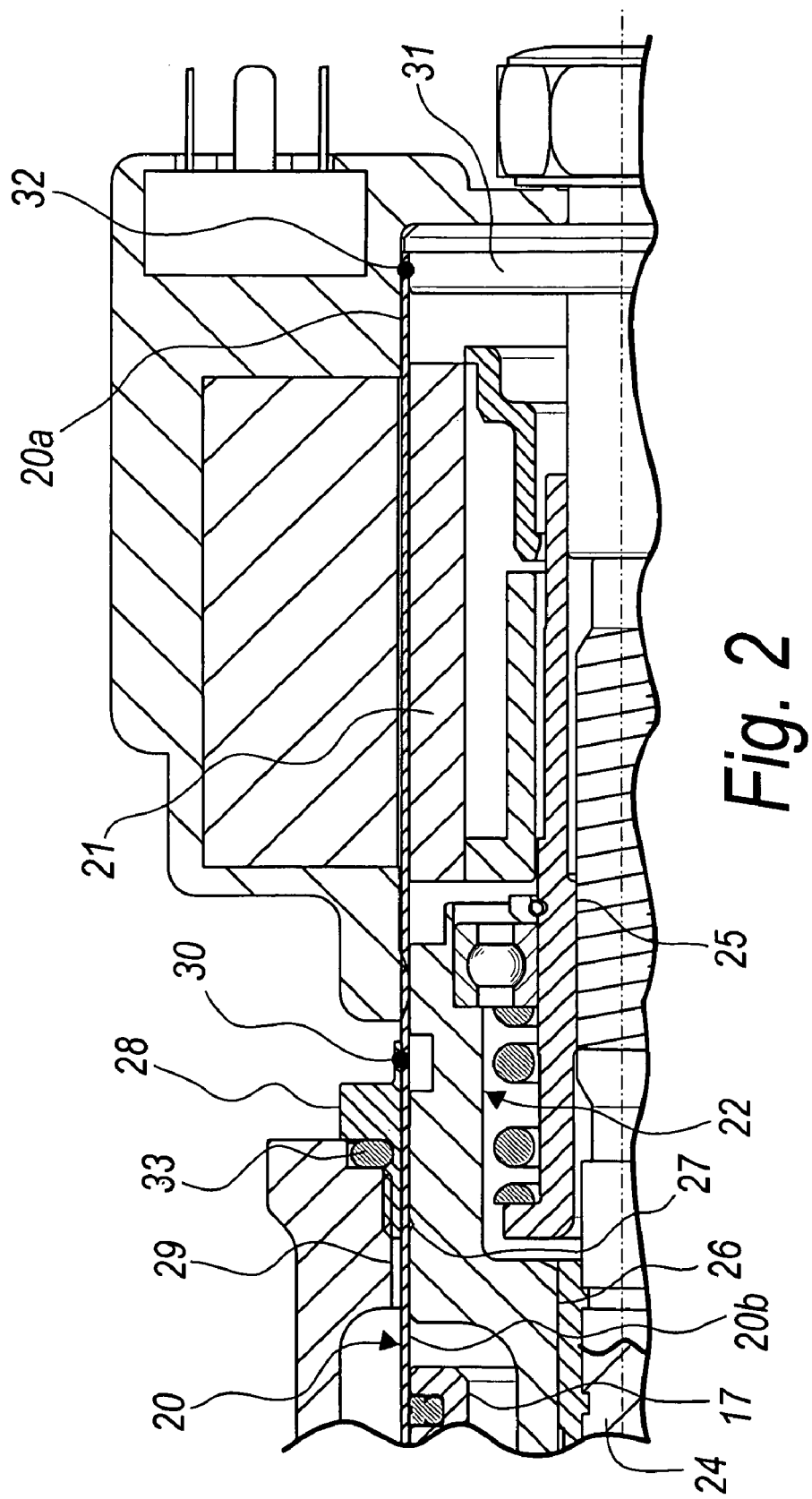
FIG. 2 is an enlarged-scale sectional view of a detail of the regulating valve according to the invention.

It is noted that anything found to be already known during the patenting process is understood not to be claimed and to be the subject of a disclaimer.

With reference to the figures, the reference numeral 10 generally designates a regulating valve, particularly for regulating the flow of refrigeration fluids, which comprises a valve body 11, which has an inlet 12 and an outlet 13 for a fluid, which are connected by a connecting opening 14, a flow control device 15 for the connecting opening 14, which is inserted in a provided seat 16 formed in the valve body 11.

The flow control device 15 in turn comprises:

a piston 17 for flow control of the connecting opening 14, an electric motor 18, which is functionally connected to the flow control piston 17 for its axial movement within a cylinder 19 which, by means of its axis, defines a sliding axis A thereof.

During use, the electric motor 18 actuates the sliding of the flow control piston 17, making it slide along the sliding axis A for the modulatable obstruction of the connecting opening 14.

The valve 10 according to the invention has a particularity in that the flow control device 15 also comprises a monolithic tubular jacket 20, which surrounds a rotor 21 of the electric motor 18 and the flow control piston 17, determining their coaxiality and further providing the cylinder 19.

Advantageously, the flow control device 15 further comprises
- a fixed core 22, which is jointly connected to the tubular-jacket 20,
- a rotary core 23, which is supported by the fixed core 22 so that it can rotate about the sliding axis A,
- a stem 24 for functional connection of the flow control piston 17, to which it is jointly connected, to the rotor 21.

The stem 24 is functionally connected
- to the rotary core 23 by means of a screw-and-nut coupling 25, and
- to the fixed core 22 by means of a guided coupling 26 for sliding along the sliding axis A.

In this manner, a rotation of the rotary core 23 jointly with the rotor 21 is converted by the screw-and-nut coupling 25 into a translational motion of the stem 24 and of the flow control piston 17 along the sliding axis A, achieving modulation of the flow control of the connecting opening 14.

The tubular jacket 20 conveniently has punched portions 27 for joint connection to the fixed core 22. Further, the flow control device 15 additionally comprises means for fixing the tubular jacket 20 to the valve body 11, which in turn conveniently comprise a threaded ring 28, which is jointly fixed to the tubular jacket 20, and correspondingly, a threaded seat 29 with which the valve body 11 is equipped, which is adapted to receive the threaded ring 28 for fastening.

More particularly, the flow control device 15 has a laser weld connector 30, which is adapted to jointly connect the threaded ring 28 to the tubular jacket 20.

Advantageously, the tubular jacket 20 is constituted monolithically by a calibrated tube made of stainless steel, which is conveniently cold-drawn, so as to have high geometric precision and limited surface roughness in particular in the part that corresponds to the region of interaction between the flow control piston 17 and the cylinder 19.

The valve 10 preferably comprises further a backplate 31 that is jointly fixed, by means of a laser weld 32, to a first end 20a of the tubular jacket 20, the flow control piston 17 being able to slide at its second end 20b.

The tubular jacket 20 thus surrounds and accommodates
- jointly rotatable components, constituted by the rotor 21 and by the rotary core 23,
- components that can perform a joint translational motion, constituted by the stem 24 and by the flow control piston 17, and
- a fixed component, which is the fixed core 22.

These components, with the tubular jacket 20 closed by the backplate 31, provide a cartridge structure, which by way of the fastening of the threaded ring 28 onto the threaded seat 29 is fixed to the valve body 11 upon installation of the valve 10 according to the invention.

The hermetic seal of the valve 10 is therefore provided by the threaded coupling of the threaded ring 28 to the threaded seat 29, which is conveniently equipped with at least one sealing gasket 33, and the coupling of the tubular jacket 20 to the backplate 31, which is provided conveniently by interference.

Further, the cylinder 19 is provided by the second end 20b of the tubular jacket 20, which by being obtained by cold drawing of a gauged tube allows reliable coaxiality of such components that it accommodates.

In practice it has been found that the invention achieves the intended aim and objects, providing a valve that allows to achieve easily a precise coaxiality among the translating components and the rotatable components.

Further, the valve according to the invention allows to achieve a reliable hermetic seal in a simple manner.

A valve according to the invention further, allows to obtain limited sliding friction of the piston within the cylinder, since such cylinder is provided by cold drawing a stainless steel tube.

The invention thus conceived is susceptible of numerous modifications and variations, all of which are within the scope of the appended claims; all the details may further be replaced with other technically equivalent elements.

In practice, the materials used, as well as the contingent shapes and dimensions, may be any according to requirements and to the state of the art.

The disclosures in Italian Patent Application No. PD2008A000251 from which this application claims priority are incorporated herein by reference.

What is claimed is:

1. A regulating valve for regulating the flow of refrigeration fluids, comprising:
- a valve body, said valve body having an inlet and an outlet for fluid, said inlet and said outlet being mutually connected by a connecting opening;
- a flow control device for controlling flow through said connecting opening, said flow control device being inserted in a seat formed in said valve body;
- said flow control device comprising:
- an electric motor, with a rotor;
- a cylinder;
- a piston for controlling flow within said connecting opening, said electric motor being functionally connected to said piston for actuation thereof with axial movement within said cylinder, said cylinder having an axis that forms a sliding axis for controlled movement of said piston suitable for obstruction of said connecting opening;
- said cylinder being a monolithic tubular jacket that surrounds the rotor of said electric motor and said piston, so as to determine coaxiality thereof wherein said piston is slidingly arranged adjacent an inner surface of said jacket;
- a stem functionally connecting said piston to said rotor; and
- a fixed core which is connected to said inner surface of said jacket, said stem being slidingly connected to said fixed core by means of a guided coupling for sliding along said sliding axis.

2. The regulating valve of claim 1, wherein said flow control device further comprises:
- a rotary core, which is supported by said fixed core so as to be rotatable about said sliding axis;
- said stem being functionally connected to said rotary core by way of a screw-and-nut coupling.

3. The regulating valve of claim 1, wherein said tubular jacket is connected to said valve body be means of a threaded ring jointly connected to said tubular jacket, said valve body being provided with a threaded seat for reversible connection to said threaded ring.

4. The regulating valve of claim 3, wherein said flow control device has a laser weld connector for joint connection of said threaded ring to said tubular jacket.

5. The regulating valve of claim 1, wherein said tubular jacket is constituted by a drawn tube with a monolithic construction.

6. The regulating valve of claim 1, wherein said tubular jacket is made of stainless steel.

* * * * *